INVENTORS
MITCHELL P. MARCUS
GEORGE E. ROSSMANN
CYRIL J. TUNIS

United States Patent Office 3,358,271
Patented Dec. 12, 1967

3,358,271
ADAPTIVE LOGIC SYSTEM FOR ARBITRARY FUNCTIONS
Mitchell P. Marcus, Binghamton, N.Y., George E. Rossmann, Newark, N.J., and Cyril J. Tunis, Endwell, N.Y., assignors to International Business Machines Corporation, New York, N.Y., a corporation of New York
Filed Dec. 24, 1964, Ser. No. 421,063
8 Claims. (Cl. 340—172.5)

ABSTRACT OF THE DISCLOSURE

An adaptive logic system comprising a plurality of cascaded adaptive memory units, with each input to the system being connected to a respective input of each of the memory units, and the output of each memory unit, being connected to an input of the next succeeding memory unit, and having a conditioning system for sequentially conditioning said units, starting with the first, until the desired output function is obtained.

---

Figure 1:
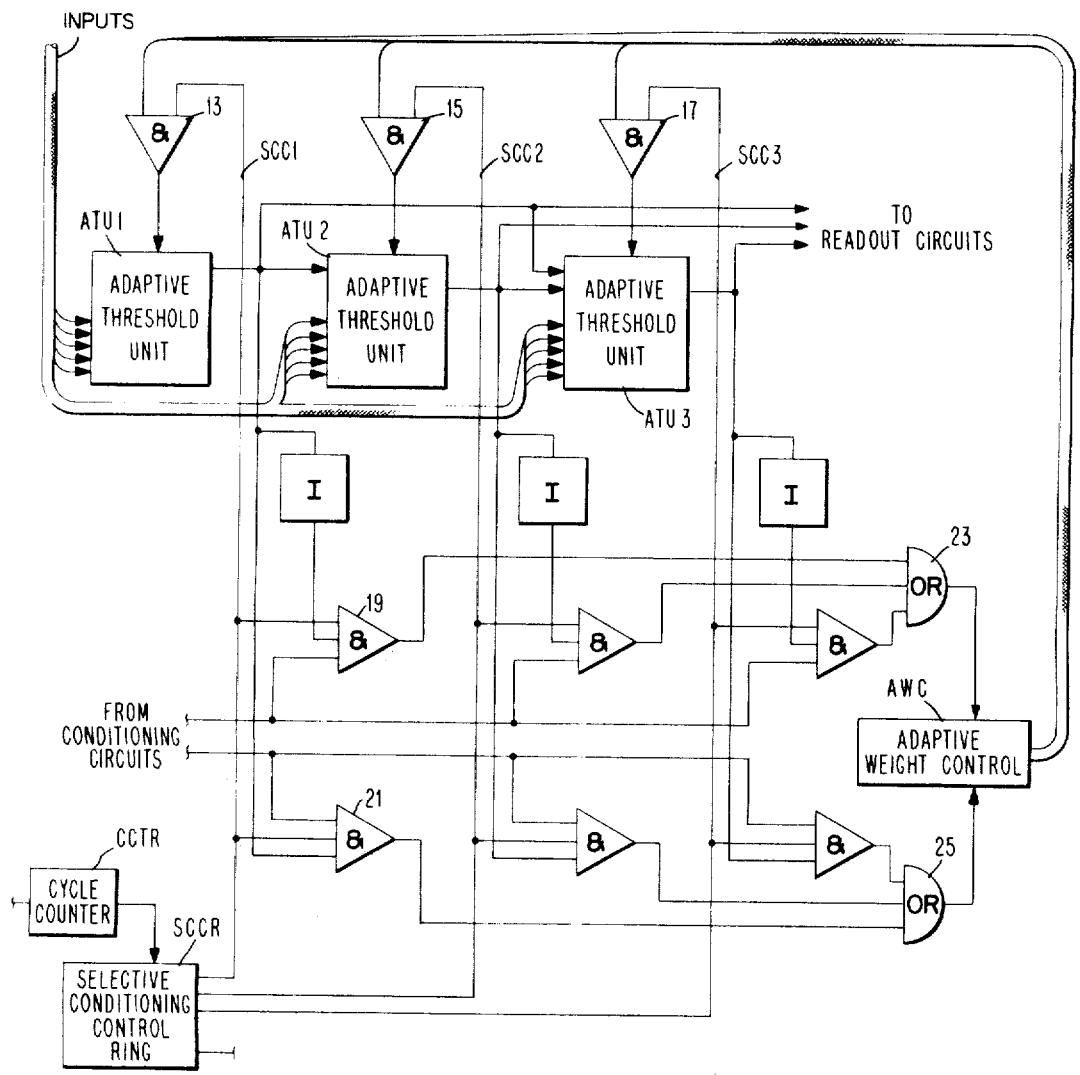

This invention relates to adaptive logic systems and particularly to an adaptive logic system which will provide an arbitrary Boolean function by appropriate conditioning or training.

It is known that certain Boolean functions are linearly separable; that is, a single adaptive threshold unit comprising a threshold circuit with a plurality of appropriately weighted input impedances will provide an output as a particular Boolean function of the inputs. On the other hand, it is also known that certain Boolean functions are linearly inseparable and a single adaptive threshold unit cannot be adapted or conditioned to converge to the point where the output will unequivocally be a single function of the input provided to the unit.

It can be shown that the output from a first adaptive threshold unit can be supplied, along with the inputs to that unit, as inputs to a second cascade-connected threshold or adaptive logic element; and the two units arranged in cascade will provide separability when a single unit cannot. In such fashion, two or more adaptive units may be cascade-connected so that separability is provided for any given Boolean function.

Accordingly, it is an object of the present invention to provide an improved adaptive logic system for arbitrary functions arranged to sequentially condition two or more adaptive threshold units which are arranged in cascade-connected fashion with the inputs supplied in multiple to all of the units, and with the output of each unit selectively connectable to an input of any of the succeeding units, or to the common output circuit. Conditioning circuits are arranged so that conditioning cycles are sequentially applied to each of the units in succession as necessary, starting with the first.

Another object of the invention is to provide an improved adaptive logic system in which a plurality of two or more adaptive threshold units are sequentially conditioned so that the minimum or near-minimum number required to achieve linear separability of a Boolean function may be utilized to provide the proper output and to stop the conditioning at that point.

Still a further object of the invention is to provide a sequentially-controlled conditioning arrangement for a plurality of cascade-connected adaptive threshold units arranged so that the sequential conditioning of the threshold units is automatically terminated when a suitable output condition has been reached, and thereafter the adaptive threshold units are switched to the normal input source.

Briefly described, the present invention contemplates the training or conditioning of a first threshold unit by suitable conditioning signals supplied thereto in selective combinations representing the function to be determined, which are supplied to the unit in a predetermined maximum number of training cycles which should be sufficient to cause the process to converge, if it will, and provide an appropriate output. If such an output is not provided within the number of cycles allotted, the output from the first unit is utilized as an additional input to a second adaptive threshold unit and the conditioning or training operation is now carried out on the second unit, utilizing the output of the first unit conditioned to its maximum degree as one of the inputs, in addition to the regular conditioning signals. As soon as the training process converges so that the desired output is provided, the conditioning operation is terminated and the input source, from which normal signals to be processed are supplied, is rendered effective to supply such signals through the trained units, and the output from the last of the units which provides a convergent signal is switched to the system output terminal so that thereafter the system functions to provide outputs as an appropriate function of the input signals.

The foregoing and other objects, features and advantages of the invention will be apparent from the following more particular description of a preferred embodiment of the invention, as illustrated in the accompanying drawings.

In the drawings:

FIG. 1 is a diagrammatic view showing an adaptive logic system in simplified fashion, and embodying the present invention.

Figure 2A:
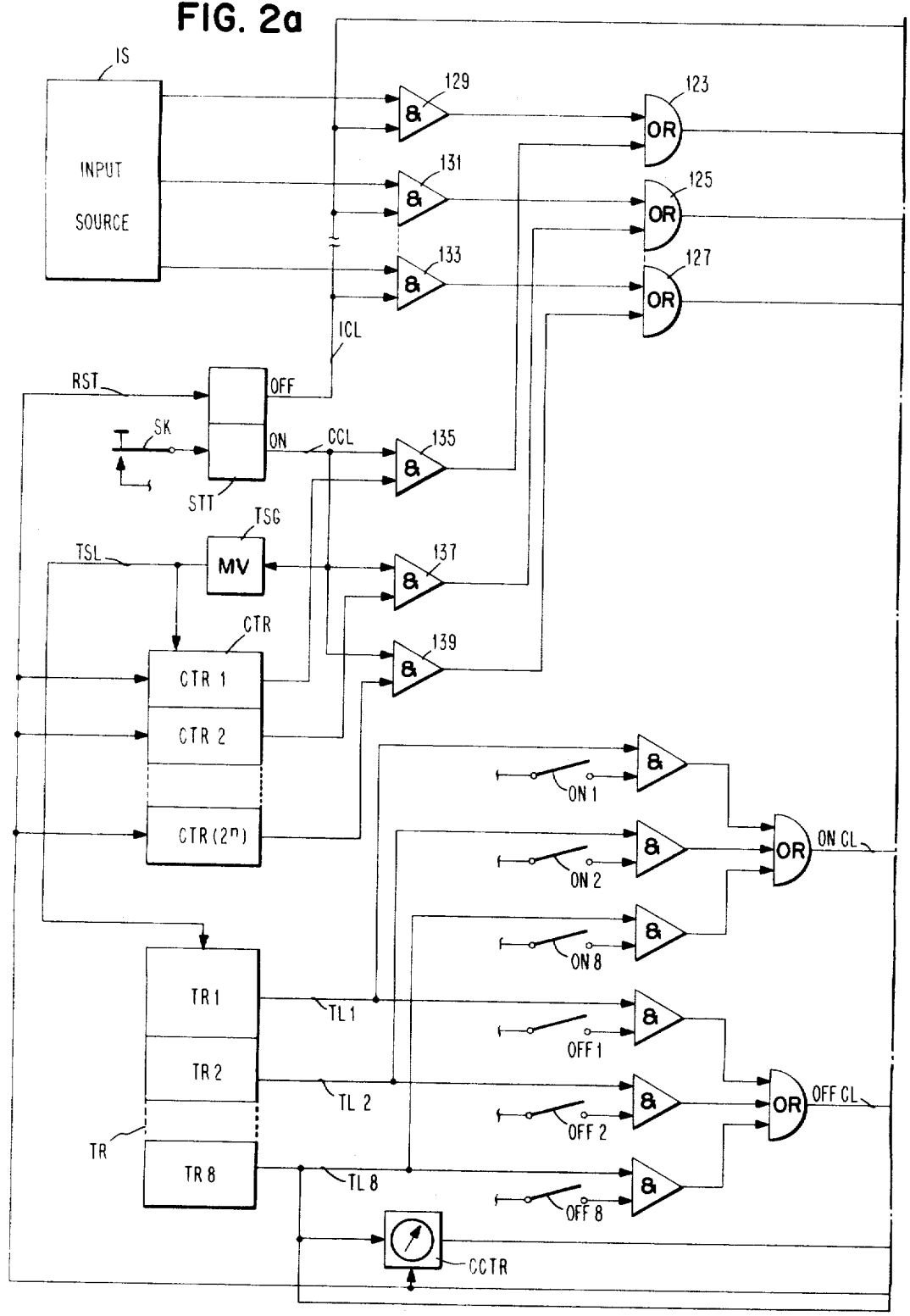
Figure 2B:
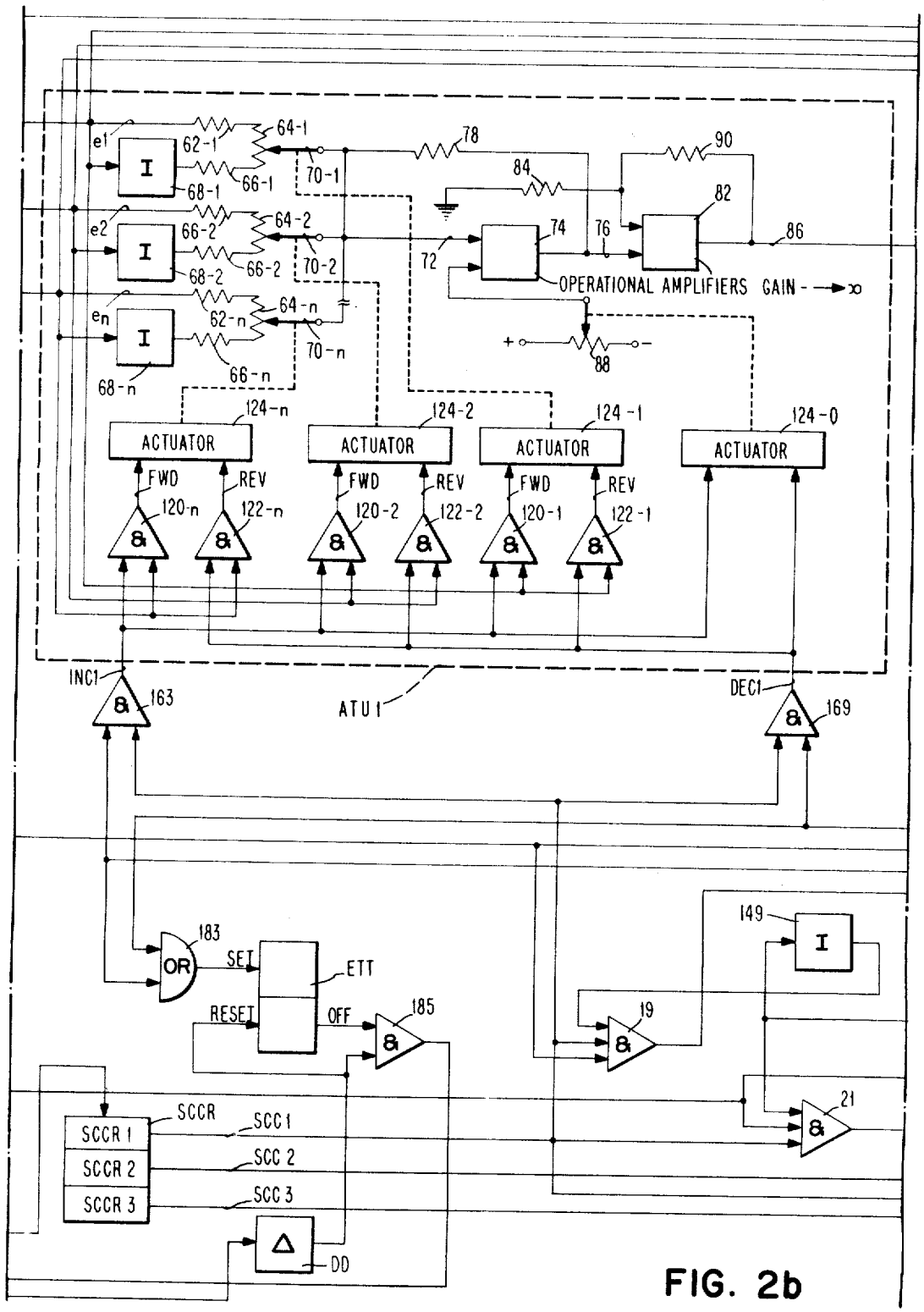
Figure 2C:
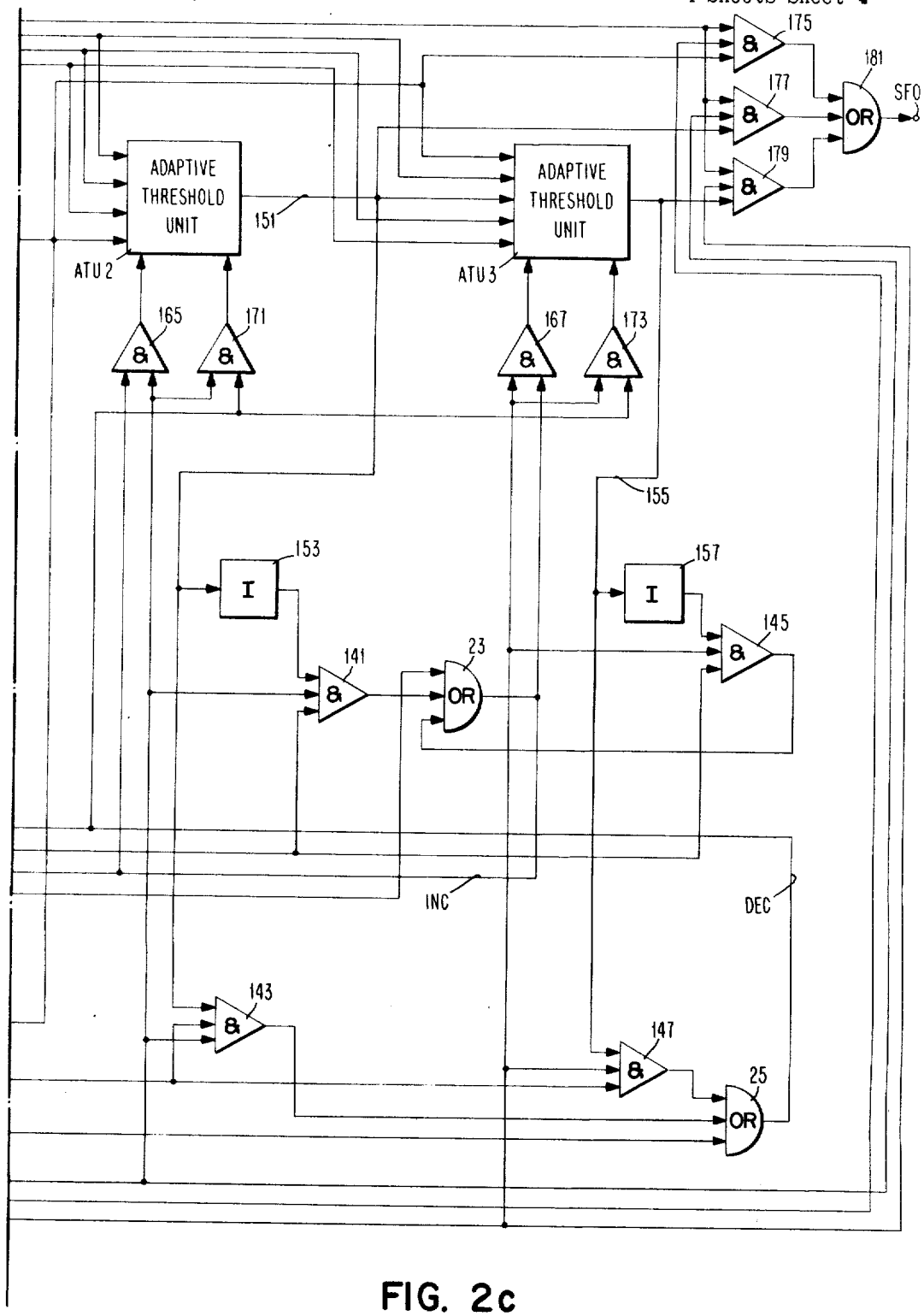

FIGS. 2a, 2b and 2c, placed side by side in the order named, are diagrammatic views in more detail of an adaptive logic system, as shown in FIG. 1, employing a preferred embodiment of the invention.

Referring now to FIG. 1 of the drawings, there is shown an adaptive logic system including three adaptive threshold units designated by reference characters ATU1, ATU2 and ATU3. Each of these adaptive threshold units comprises a plurality of adjustable weighting resistors, to which input signals are supplied, and a threshold unit connected to the output thereof, so that an output will be supplied from the adaptive threshold unit when a particular pattern of input signals has been supplied thereto, in accordance with the weighting assigned to the various impedances connected to the inputs. The inputs, as shown, are all connected in multiple to input terminals of each of the adaptive threshold units in the system. Additionally, the output of each of the adaptive threshold units, starting with the first unit, is supplied as an additional input to the succeeding units; e.g., the output from unit ATU1 is supplied as an additional input to unit ATU2 and ATU3.

The outputs from each of the adaptive threshold units ATU1 through ATU3 are also supplied to readout circuits, not shown in FIG. 1, which selectively connect the output of the final converging unit to a system output terminal. The adaptive threshold units are arranged to have their input impedances altered or to have the system otherwise adapted to unique threshold situations for the various input conditions by conditioning circuits which include a plurality of circuits supplied in common from an adaptive weight control circuit AWC, the weight control signals therefrom being supplied to a plurality of AND circuits associated with each of the adaptive threshold units and indicated generally by the reference characters 13, 15 and 17. These AND circuits are arranged in such manner that the conditioning controls supplied from the unit AWC are effective to energize the conditioning means within each of the adaptive threshold units when and only when a suitable selective signal is supplied thereto via a selective conditioning control line associated with each of the adaptive training units, and herein designated by the reference characters SCC1, SCC2 and SCC3.

Signals are sequentially supplied to these lines in the order named from a selective conditioning control ring or commutating circuit SCCR, which is arranged so that it provides sequential outputs on a plurality of output lines equal in number to the number of adaptive stages in the system. The input to the ring SCCR is supplied from a cycle counter CCTR, in such manner that after each of the conditioning cycles to be subsequently explained, the ring SCCR is advanced one step or stage, to thereby energize the associated control line.

For each selective output of the selective conditioning control ring SCCR, the output from the associated adaptive threshold unit, such as ATU1, is combined with conditioning controls from a set of conditioning circuits, not shown on the diagram but to be subsequently explained, which provide the conditions to which the threshold unit should adapt. The increase or decrease condition controls are combined with the output from the adaptive threshold unit both in its positive and inverted form, and are supplied via AND circuits such as the AND circuits 19 and 21 through a pair of OR circuits 23 and 25 to the adaptive weight control unit AWC. These inputs to the adaptive weight control unit govern the output of this unit in such manner that the conditioning signals supplied to the adaptive threshold unit which is being conditioned at that time are of such nature as to cause either a suitable increase or decrease in the weighting impedances or other adaptive elements within the unit. A similar set of switching circuits is provided for each of the stages in the system, to combine the outputs of the conditioning control ring, the conditioning circuits and the outputs of the adaptive threshold unit to govern the adaptive weight control so that, depending upon which position of the selective conditioning control ring is effective, the particular adaptive threshold unit associated therewith will have conditioning signals applied thereto, to the exclusion of the other units.

In operation, it will be assumed that all of the adaptive threshold units have their internally contained weighting devices in some random and unknown condition, and that the training cycle is initiated for the particular set of conditioning signals to be recognized. With a conditioning signal on the requisite input lines to the adaptive threshold units, and the cycle counter at the zero count, appropriate conditioning control is provided by setting up circuits not shown which will indicate the condition to which the adaptive units should be adapted to provide the desired output. The training cycle is then initiated by circuit operation to be subsequently described in connection with the detailed embodiment.

The various conditioning signals are successively supplied to the inputs of the adaptive threshold units as well as the conditioning controls; and when a disparity exists between the inputs and the conditioning controls, suitable signals are supplied to the adaptive weight control unit AWC to change the weighting of the components within the adaptive threshold unit ATU1. Assuming that the adaptive threshold unit ATU1 is able to provide an output because the function is linearly separable, before the cycle counter CCTR reaches the end of its operating range, an output signal from the adaptive threshold unit will correspond to all of the desired input conditions. Under such circumstances, the adaptive weight control unit will not receive any commands to change the weight control during a particular one of the training cycles. When such a condition exists, the operation of the training circuits is halted, and the system is then switched to accept only the inputs from the input source, excluding those from the conditioning circuitry; and the readout circuits are enabled by a signal supplied from a readout control circuit to connect the output from ATU1 to the system output.

Now let it be assumed that, after the predetermined number of training cycles, it is evident that the process has not converged, that continuing conditioning signals are being supplied to the adaptive weight control unit and that the cycle counter has indicated that the normal number of training cycles has been achieved. Under these circumstances, an advancing signal will be supplied from the cycle counter to the selective conditioning control ring SCCR, which will advance one stage so that the signal will be removed from line SCC1 and a signal will be supplied on line SCC2. It will be apparent from the drawings that the conditioning circuits as well as the output circuits are now transferred to render the adaptive threshold unit ATU2 effective both for conditioning and for a possible output. In addition to the signal supplied to adaptive threshold unit ATU2 from the normal input circuits, it can be seen that the output from adaptive threshold unit ATU1 is also supplied thereto. Should the adaptive threshold units ATU1 and ATU2 now provide an output as desired, the conditioning cycling will stop before the counter CCTR reaches its limit, since no further change signals will be supplied to the adaptive weight control unit AWC. Under this condition, the conditioning process will be stopped, normal inputs from the input source will be supplied to the input lines, and the readout control will connect the output of unit ATU2 to the system output.

In similar fashion, if two of the units are insufficient to obtain the desired output function, the ring SCCR is stepped to its third position, and a conditioning cycle is initiated. The process can be, of course, repeated as many times as necessary with as many stages as is necessary to achieve the desired results.

Having generally described the construction and operation of one embodiment of the invention, a detailed description of an arrangement showing all the details of the input and output circuitry and the conditioning circuitry as well as an exemplary type of adaptive threshold unit will now be described, by describing the details of the system illustrated in FIGS. 2a, 2b and 2c.

Referring first to FIG. 2b, the adaptive threshold unit ATU1 will be described in detail, and this one description will suffice for all of the units since they are all similar. The adaptive threshold unit ATU1 comprises a plurality of elements enclosed within the dotted rectangle, and is essentially similar to the arrangement shown and claimed in U.S. patent application Ser. No. 334,765, filed Dec. 31, 1963, and assigned to the common assignee (Docket 6554). In this arrangement, three input terminals $e1$, $e2$ and $en$ are shown, but as many terminals may be provided as required by the number of input functions to be handled by the adaptive threshold units. Input signals supplied to these terminals from the information source or the training source, to be described later, are applied through resistors such as 62–1, 62–2 or 62–$n$, respectively, to one side of potentiometers 64–1, 64–2 and 64–$n$. The other sides of these potentiometers are coupled through resistors 66–1, 66–2 and 66–$n$ to inverters 68–1, 68–2 and 68–$n$, which also receive the input signals supplied to terminals $e1$, $e2$ and $en$. Thus, each of the signals and its inverted form appear across the potentiometers, one of which is provided for each of the inputs to the threshold unit. The movable contacts of the potentiometers, such as 70–1, 70–2 and 70–$n$, are electrically connected to a comon conductor 72 which serves as an input to a first operational amplifier 74, the other input of which is connected to the movable arm of a potentiometer 88 which has its two terminals connected to a suitable source of direct current designated by the plus and minus signs shown. The output 76 of operational amplifier 74 is connected via a feed-back resistor 78 to the input 72. Output 76 of operational amplifier 74 is also supplied as one input to operational amplifier 82, the other input of which is connected to ground via a resistor 84; and a feed-back from the output 86 of amplifier 82 is provided via a resistor 90 to the one input of amplifier 82. The output 86 represents the output of the adaptive threshold unit ATU1.

The gain of the operational amplifiers 74 and 82 is chosen sufficiently high, so that for practical purposes it may be considered as approaching infinity. In this case, the input conductance of the amplifier is virtually equal to zero with respect to the conductances looking into the potentiometers, which are isolated by the input resistors 62 and 66, so that their high impedance relationship is maintained. Each of the potentiometer arms, such as 70–1, 70–2 and 70–n, is mechanically connected to suitable actuating mechanims, such as 124–1, 124–2 and 124–n, having forward and reverse acting inputs supplied thereto via AND circuits such as 120–1 and 122–1 associated with the actuator 124–1. The biasing resistor 88, associated with the operational amplifier 74, also is governed by an actuator 124–0. Increment and decrement signals are supplied over a pair of lines designated as INC1 and DEC1, and are supplied directly to the inputs of actuator 124–0, so that, when a signal is present on either the increment or decrement line to the unit, ATU1, the actuator 124–0 will be operated to either increase or decrease the reference voltage supplied to operational amplifier 74. The increment and decrement lines are also connected in parallel to the input AND circuits for the actuators associated with the input potentiometers as is manifest from the drawings. The other inputs to these AND circuits are from the input terminals $e1$, $e2$ and $en$. The input terminal $e1$, for example, is connected to the AND circuits 120–1 and 122–1, which are associated with the actuator 124–1, which in turn governs the movable contact 70–1 of potentiometer 64–1 connected to the input $e1$.

In operation, if an increment signal is supplied on the line INC1 to the adaptive threshold unit ATU1, each of the AND gates 120–1, 120–2 and 120–n will have one input thereof energized. Assuming now that a signal is present on input terminal $e1$, the other input to AND gate 120–1 will be energized to thereby supply an output to the actuator 124–1 which will operate the movable arm 70–1 of potentiometer 64–1. This will increment the weighting of the associated active signals and thus increase the signal developed by the operational amplifier 74. The actuators 124 typically change the associated potentiometer contacts 70, each by a unit amount, when operated, which may be accomplished by the use of conventional stepping switches, for example. Also, as previously pointed out, at any time that an increment or decrement signal is supplied to the adaptive threshold units, the tare weight input to the amplifier 72 from the reference potentiometer 88 is varied in a corresponding direction by operation of the actuator 124–0. The output from amplifier 76 is provided to one of the two inputs of amplifier 82, and the feed-back resistor 90 and hysteresis resistor 84 are arranged together with the parameters of the amplifiers in such a manner that amplifier 82 serves as a threshold device having a small hysteresis effect. When the amplitude of the signal in line 76 reaches a predetermined value, operational amplifier 82 will provide full output on line 86, as a result of having traversed one portion of its hysteresis loop. When the signal on line 76 falls below a predetermined amount, different from that required to set the amplifier 82 fully conducting, amplifier 82 will switch to its off condition, thereby removing the signal on the output line 86. Thus, amplifier 82 and its associated circuitry function as a threshold device for the signals supplied to it on line 76.

In similar fashion, a signal on the decrement conductor DEC1 will provide an enabling input to each of AND gates 122–1, 122–2 and 122–n. Depending upon which of these AND gates is activated by the signals at $e1$, $e2$ or $en$, the associated actuators 124–1, 124–2 or 124–n are selectively energized in a reverse direction to change the associated ones of potentiometer contacts 70–1, 70–2 or 70–n. Accordingly, the weighting provided by each of the potentiometers is changed to decrease the magnitude of the signal devolped by the operational amplifier 74 in accordance with the decrement instruction received. In this regard it will be noted that the inverters 68–1, 68–2 and 68–n permit negative weights to be employed in the weighting of the input signals $e1$, $e2$ or $en$.

By changing the weighting of the active signals on terminals $e1$, $e2$ or $en$, the output signal from the operational amplifier 74 is changed in such manner as to either exceed or not exceed the threshold established for amplifier 82, and thereby provide an output on the output line 86 when and only when the input signals are supplied to the adaptive threshold unit ATU1 in accordance with preselected requirements in a manner to be subsequently explained.

Having thus described the general structure of one of the adaptive threshold units, the organization of these units into the entire system will now be described with reference to FIGS. 2a, 2b and 2c taken together. The adaptive unit input circuits, such as those connected to the terminals $e1$, $e2$ and $en$ of unit ATU1, are also connected in multiple to similar input terminals in the remaining adaptive threshold units in the system; namely, ATU2 and ATU3. Also, the output line 86 of adaptive threshold unit ATU1 is connected as an additional input to the adaptive threshold unit ATU2, and the output of unit ATU2 is connected as an additional input to unit ATU3. Accordingly, in addition to the common adaptive unit inputs, each of the adaptive threshold units after the first has supplied thereto, as an additional adaptive unit input the output of the previous unit or units. The adaptive unit input lines to the first of the adaptive threshold units are supplied from the outputs of a plurality of OR circuits, such as 123, 125 and 127, each having one input connected to an associated AND circuit 129, 131 or 133, respectively, these AND circuits having one input supplied thereto from the original input signal source IS. The signals supplied from the original input signal source constitute the signals to be recognized by the adaptive logic after appropriate training. The AND circuits connected between the OR circuits and the input signal source are arranged to be enabled when an input control line ICL is energized by a starting trigger STT, as will subsequently be described. During the training portion of the operating cycle, the other inputs to the OR circuits are energized from an associated plurality of AND circuits such as 135, 137 and 139, one input to these AND circuits being a signal on a conditioning control line CCL, which is supplied from the trigger STT. Accordingly, it will be seen that the inputs to the adaptive threshold units are selectively supplied either from the input source IS or from training circuitry to condition the units in a manner to be described.

The starting trigger STT is of conventional design, arranged so that normally the uppermost portion provides an output on the line ICL while no output is provided on line CCL. When the key SK is operated, the trigger is switched to its reversed condition, in which line CCL is provided with a signal while the signal is removed from line ICL. At the end of the conditioning cycle, the trigger STT is reset to its normal condition by means of a reset signal on a line RST, the derivation of the reset signal to be subsequently described.

With the starting trigger in its ON condition, and line CCL energized, a timing signal source such as a multivibrator, designated by reference character TSG, is energized and periodically provides timing signal outputs for governing the operation of the counters and the training ring described hereinafter. The timing signal source TSG is constructed and arranged to provide a series of spaced timing signals. The duration of the signals and the space between the signals are governed by design of the system, and may take any suitable value which is adequate to allow proper operation of the apparatus controlled thereby. The timing signals from the source TSG are supplied on a line TSL, one branch of which is supplied to the input of a multistage binary counter, only three stages of which are shown in the drawings and designated by the reference character CTR1, CTR2 and CTR(2n). The counter CTR is of conventional structure, and its details are not shown, since it may take any one of a number of well-known forms. Suffice it to say that the stages are connected in cascade and operate in binary fashion with outputs supplied therefrom to associated ones of the AND circuits, such as 135, 137 and 139. Resetting signals are supplied from the line RST to each of the stages of the counter, so that, at resetting time, the counter is set to its initial state where all of the outputs are off. Upon the supply of a first pulse from a source TSG, stage CTR1 will go on and supply an output therefrom to AND circuit 135; and with line CCL energized, a signal will be supplied by OR circuit 123 to the terminal e1 of the adaptive threshold unit ATU1, as well as to the corresponding terminal of the other adaptive threshold units. The second pulse will turn stage CTR1 off and turn stage CTR2 on, thereby energizing AND circuit 137, thus supplying an input to terminal e2. In similar fashion, as successive pulses are supplied to the counter CTR, the various stages will be turned on and off in binary combinations until all of the eight possible combinations for the three input lines have occurred. Timing pulses from the source TSG are also supplied over line TSL to the input of a cascade-connected ring circuit of conventional design, having as many stages as the possible number of conditions, either ON or OFF, for which the system must be trained. In the present case, for example, since there are three inputs, there are eight possible ON or OFF combinations to which the system can be trained, constituting the eight possible conditions which may be assumed by the input signal lines. Accordingly, there would be provided in the training ring TR in this instance eight stages, only three of which are shown, but the remainder of which would be utilized in similar fashion to that which will be described for the three shown; namely, TR1, TR2, and TR8. The ring is constructed and arranged in conventional fashion so that the outputs thereof are sequentially energized, one at a time, beginning at the first and proceeding step by step to the last stage. Outputs are accordingly supplied at successive intervals on output lines from the ring TR, these output lines being designated as TL1, TL2, ... TL8. To provide for training this system to respond to either OFF or ON combinations or "don't care" conditions, a plurality of ON and OFF switches are utilized, an ON switch being provided for each of the possible combinations and an OFF switch likewise being provided for each of the possible combinations. Accordingly, in the present instance, eight ON switches would be utilized and eight OFF switches would be utilized. Only three of the ON and three of the OFF switches are shown in the drawings and are designated as ON1, ON2 and ON8, and OFF1, OFF2 and OFF8. These switches, when closed, provide an input to one of two inputs of associated AND circuits, the other input being provided from the appropriate training ring output line, so that, as the training ring progresses from position to position, energizing its output lines successively, the AND circuits associated with the ON and OFF switches will also supply outputs providing their associated switch is closed. All of these AND circuits have their outputs connected together to the input of two OR switches, the outputs of which are designated as ON conditioning line ONCL and OFF conditioning line OFFCL. It should be apparent that it is possible to set up all of the combinations which it is desired that the system shall recognize by closing appropriate ones of the sixteen switches in the present system; and, as the training ring proceeds through its eight output stages, successively, either the line ONCL or the line OFFCL, or neither, will be energized accordingly. The conditioning signals thus provided on lines ONCL and OFFCL are supplied via further logic circuits to the particular one of the adaptive threshold units which is being trained at any given time.

The output of the last stage of the training ring, such as TR8, is also supplied as an input to a predetermined counter CCTR, indicated by the rectangle with an arrow encircled therein to designate a predetermined counter of conventional construction in which the counter may be set to provide an output when and only when a predetermined number of input signals has been supplied thereto. This counter is used to determine the number of training cycles which each of the adaptive threshold units will have supplied to it, before it is determined that the next unit should be utilized. For example, if it is determined that three training cycles should be sufficient for the adaptive threshold units to converge for a given set of input conditions, the counter CCTR will be set to provide an output after three input pulses. Accordingly, after the training ring TR has gone through three cycles of operation, the last cycle will provide an output from the counter CCTR.

The output from CCTR is supplied as an input to the first stage of a selective conditioning control ring SCCR, which is provided with as many stages or positions as the number of adaptive threshold units which may be connected in cascade; in the present instance, three stages are utilized. It can be seen therefore that, as the training ring TR operates through its training cycles, each time that a particular number of cycles has been completed as determined by CCTR, the ring SCCR will advance by one stage. The outputs from the ring SCCR are used to govern the selection of the particular adaptive threshold unit which is to be trained.

The lines ONCL and OFFCL are connected as inputs to pairs of AND circuits, one pair being provided for each of the adaptive threshold units in the system, such as the AND circuits 19 and 21 associated with threshold unit ATU1, 141 and 143 associated with threshold unit ATU2, and 145 and 147 associated with threshold unit ATU3. A second input to each of the pairs of AND circuits is supplied by the selective conditioning control ring output associated with that particular unit. For example, line SCC1 is connected as an input to AND circuits 19 and 21, associated with threshold unit ATU1; line SCC2 provides a second input to the AND circuits 141 and 143, associated with unit ATU2, and line SCC3 provides a second input to AND circuits 145 and 147, associated with unit ATU3. Accordingly, it can be seen that two of the required conditions for providing an output from these AND circuits are the selection of the proper conditioning control line ONCL or OFFCL, plus the selection of the particular adaptive threshold unit involved by energization of the corresponding stage of the selective conditioning control ring SCCR.

The third input to the pairs of AND circuits associated with each of the stages is provided by the output of that stage, both in its normal and inverted form; for example, output line 86 of adaptive threshold unit ATU1 is supplied as a direct input to AND circuit 21, and, via inverter 149, is supplied as a third input to AND circuit 19. The output of unit ATU2 on line 151 is supplied directly as one input to AND circuit 143 and via an inverter 153 to AND circuit 141. Similarly, the output line 155 from unit ATU3 is supplied directly as an input to AND circuit 147, and via inverter 157 to an input of AND circuit 145.

From the foregoing, it will be apparent that each of the pairs of AND circuits associated with the adaptive threshold units and governed principally by the conditioning circuits, is arranged to be enabled when and only when the ring SCCR is providing an output for that particular unit on the associated line SCC1, SCC2 or SCC3. Also, the selection between one or the other of the two AND circuits associated with the adaptive threshold unit is governed by whether or not the line ONCL or OFFCL is energized via the conditioning switches previously described. As a last requirement, the output at that time of the adaptive threshold unit, either in its ON condition or via an inverter in its OFF condition, is applied as an input to the AND circuit.

The output of AND circuits 19, 141 and 145, all associated with the ON conditioning line ONCL, and with the three threshold units ATU1, ATU2 and ATU3, respectively, are connected as inputs to an OR circuit 23. The outputs of AND circuits 21, 143 and 147, all associated with line OFFCL and with the threshold units ATU1, ATU2 and ATU3, respectively, are connected as inputs to a second OR circuit 25. The outputs of OR circuits 23 and 25 are designated as INC and DEC, respectively, connoting the fact that the signals on these lines control the increase or the decrease respectively of the weights in the adaptive threshold units.

Line INC is connected as one input to one of a pair of associated AND circuits which govern the conditioning actuators for the adaptive threshold units, such as AND circuit 163, 165, and 167, associated with units ATU1, ATU2 and ATU3, respectively. Similarly, line DEC is connected as one input of AND circuits 169, 171, and 173, associated with units ATU1, ATU2 and ATU3. The other input to these AND circuits which supply the increase and decrease controls to the adaptive threshold units is the associated sequential conditioning control output line, such as SCC1, connected as an input to AND circuits 163 and 169, SCC2 connected as an input to AND circuits 165 and 171, and SCC3 connected as an input to AND circuits 167 and 173.

The signals on lines SCC1, SCC2 and SCC3 are also utilized to selectively switch the outputs of the adaptive threshold units to the system function output terminal SFO by selectively energizing one of three AND circuits 175, 177 or 179. The other inputs to these AND circuits are supplied from the outputs of the adaptive threshold units ATU1, ATU2 and ATU3, respectively, as well as line ICL.

Accordingly, the output AND circuits are enabled only when the system is receiving signals from the input source IS; in other words, after the training operation has been completed. The outputs of the AND circuits 175, 177 and 179 are supplied through an OR circuit 181 to the system terminal SFO. It is apparent that whichever one of the adaptive threshold units becomes finally adapted to recognize all of the input functions will have its output connected via the associated one of the three output AND circuits and the OR circuit to the system output terminal SFO.

In order to terminate the training cycle after the adaptive threshold units have been trained through a sufficient number of cycles to provide a proper output, there is provided an end-of-training trigger ETT, having a set or turn-on-input provided from the lines INC and DEC through an OR circuit 183, and having a reset signal supplied thereto from the last stage output TC8 of the ring TR, via a delay device DD, which output is also supplied as one input to an AND circuit 185, the other input of which is connected to the OFF side of trigger ETT. The output of AND circuit 185 is connected to the line RST, which resets the start training trigger STT.

If, during any training cycle, one or more weight changes occur, as evidenced by signals on the lines INC or DEC, these signals will be passed by OR circuit 183 to set trigger ETT on. At a predetermined time after the last position of ring TR is turned on, a pulse will be supplied via the delay device DD, to reset trigger ETT. If, in this cycle, no weight changes occurred, the trigger ETT will be off, and the OFF output of ETT is combined with the output of the delay device DD in AND circuit 185 to supply a reset pulse to the start trigger STT, which will restore it to its OFF state, in which state the conditioning control line CCL is disabled and a signal is supplied on the line ICL. On the other hand, if a change has occurred during the last cycle, the trigger ETT will be ON; and, when the pulse is supplied from the delay device DD to reset the trigger, there will be no output from the OFF side of the trigger at this time, therefore no reset signal will be supplied via AND circuit 185.

In operation, the training switches, such as ON1 through ON8, and OFF1 through OFF8, are set in the condition required for each of the possible eight states which the system is to recognize, this being the greatest number of combinations which can be provided on three separate input lines. Following the positioning of the switches for the combinations to be learned, the start key SK is depressed, thereby setting trigger STT on, and accordingly switching the inputs of the adaptive logic units to the outputs of the counter CTR and starting the multivibrator TSG so that the counter CTR starts counting through its various binary combinations and thus providing outputs for all of these combinations on the three input lines to the adaptive threshold units. Likewise, the ring TR starts advancing through its various stages, and, as it progresses, the ON or OFF control lines ONCL and OFFCL are selectively energized in accordance with the combinations of the training switches which have been set up for the learning process. The ring SCCR will be in its initial position, so that line SCC1 is energized, and thereby supplies the proper increment and decrement signals to unit ATU1, in accordance with whether the output of unit ATU1 indicates that an increase or decrease should be provided. If the system trains properly on the first unit, the last stage of operation of the ring TR will not produce any outputs on the line ONCL, or line OFFCL, so that the end-of-training trigger ETT will be off; and a reset output will be accordingly provided, which will restore trigger STT and thereby switch the input signal source IS to the inputs of the adaptive threshold units, while the output circuit is switched to provide an output from adaptive unit ATU1 to the system output terminal SFO.

However, if the system does not train within a predetermined number of cycles, as set into the cycle counter, CCTR, then counter CCTR will provide an output to ring SCCR, which will advance then to energize line SCC2, which will render the adaption and output circuits effective to control the adaptive threshold unit ATU2. If the system including the two units in series is then trainable to provide outputs for all desired functions of the inputs, training will stop at this point. However, if not, then the system will advance to use all three adaptive threshold units in cascade. Obviously, as many adaptive threshold units may be utilized as is required to insure that the system will train for the desired function of the input signals.

It should be obvious that other types of adaptive threshold units may be employed other than the motor-operated potentiometers and operational amplifiers shown in the present instance.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. An adaptive logic system comprising, in combination:

a plurality of adaptive threshold units, each having a plurality of inputs and an output, said units being connected in cascade, with the output of any unit connected to an input of the next succeeding unit, including weighting means and threshold means in each unit effective for predetermined settings of said weighting means and for predetermined combinations of input signals to supply an output signal;

adaptive weight control means for selectively supplying weight control signals to said adaptive threshold units to adjust the weighting means;

means responsive to the conditioning of said adaptive threshold units to discontinue the supply of weight control signals when said adaptive threshold units provide an output as a desired function of the inputs; and sequential control means for sequentially connecting said weight control means to said adaptive threshold units.

2. An adaptive logic system as claimed in claim 1, further including means for governing said sequential control means to sequentially change the connection of said weight control means to said adaptive threshold circuits after a predetermined number of cycles of operation of said weight control unit.

3. An adaptive logic system as claimed in claim 2, further including means governed by said sequential control means for selectively connecting the outputs of said adaptive threshold units to a system output terminal.

4. An adaptive logic system as claimed in claim 3, further including means for selectively and simultaneously supplying training signals to the inputs of each of said adaptive threshold units.

5. An adaptive logic system comprising, in combination:

a plurality of adaptive threshold units connected in cascade, each having a plurality of inputs and an output, the output of any of said units being connected to one of the inputs of the next succeeding unit, each of said units including a plurality of adjustable weighting means, one for each of said inputs, and a threshold device connected to said inputs via said weighting means, and effective to provide an output signal at said output, after a predetermined combination of signals is supplied to said inputs for a predetermined setting of said weighting means;

a training trigger settable to a first or a second stable state;

a source of input signals having a plurality of input signal source lines;

a training signal source of sequentially generated training signals, providing, when effective, repetitive sequences of signals one at a time, equal in number to the number of inputs to the first of said adaptive threshold units on a plurality of training signal source lines;

first switching means governed by said training trigger for connecting said input signal source lines to the inputs of each of said threshold units in parallel when said trigger is in its first stable state or connecting said training signal source lines to the inputs of said adaptive threshold units in parallel when said trigger is in its second stable state;

a conditioning signal source operative when rendered effective to sequentially supply a plurality of sequential conditioning signals to a conditioning signal channel in sequences determined in accordance with a desired input-output function of the system, said conditioning signal source being effective when said training trigger is in said second state;

selective conditioning control means governed by said conditioning signal source to sequentially connect said conditioning signal channel to said adaptive threshold units, beginning with the first unit, to supply conditioning signals to said adjustable weighting means for varying the response of said adaptive threshold units;

training completion detection means for detecting the adaption of the system to a predetermined input-output function and effective when said adaption is detected to disable said selective conditioning control means; and second switching means governed by said selective conditioning control means for selectively connecting the output of the last of said threshold units to be adapted to a system output terminal.

6. An adaptive logic system as claimed in claim 5 further comprising:

said conditioning signal channel including a first bus to which signals are supplied to effect an increase in the value of the adjustable weighting means in said threshold units, and including a second bus to which signals are supplied to effect a decrease in the value of the adjustable weighting means in said threshold units.

7. An adaptive logic system as claimed in claim 5 further comprising:

cycle counting means governed by said conditioning signal source and effective when said conditioning signal source has supplied a predetermined number of cycles of sequential conditioning signals for causing said selective conditioning control means to step to its next sequential condition.

8. An adaptive logic system as claimed in claim 5, further comprising:

reset means governed by said training completion detection means for resetting said training trigger, said training signal source, said conditioning signal source and said selective conditioning control means after said system has been trained to respond to a predetermined input-output function.

References Cited

UNITED STATES PATENTS

| | | | |
|---|---|---|---|
| 3,097,349 | 7/1963 | Putzrath et al. | 340—172.5 |
| 3,103,648 | 9/1963 | Hartmanis | 340—172.5 |
| 3,106,699 | 10/1963 | Kamentsky | 340—172.5 |
| 3,192,505 | 6/1965 | Rosenblatt | 340—146.3 |
| 3,253,158 | 5/1966 | Horgan | 340—172.55 |
| 3,273,125 | 9/1966 | Jakowatz | 340—172.5 |
| 3,284,780 | 11/1966 | Clapper | 340—172.5 |

OTHER REFERENCES

Moraff, H.: Artificial Neurons—For Machines That Learn, in Electronic Industries, December 1963, pp. 52–56.

Corneretto, A.: Variable-Network Perceptron Almost Completed at GD/E in Electronic Design, Sept. 13, 1961, pp. 38–39.

ROBERT C. BAILEY, *Primary Examiner.*

J. P. VANDENBURG, *Assistant Examiner.*